S. CUMMINGS.
Hop Culture.
No. 211,295.　　　　　Patented Jan. 14, 1879.
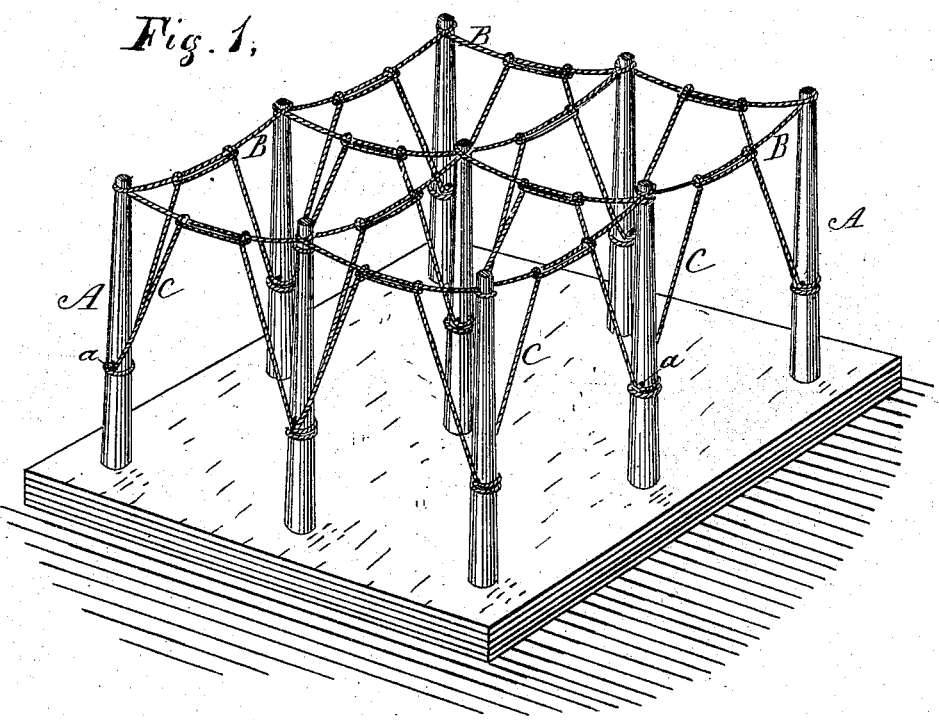
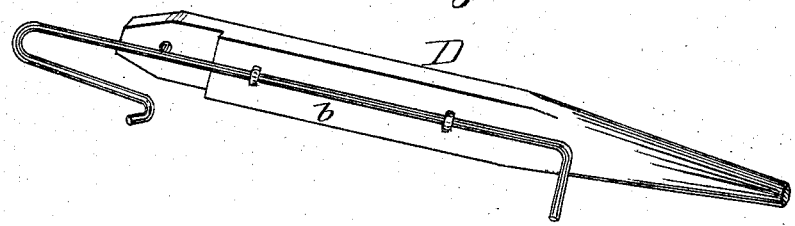
Witnesses
Warren Seely
L. H. Wiley
Inventor
Schuyler Cummings
by Ellis Spear
Attorney

UNITED STATES PATENT OFFICE.

SCHUYLER CUMMINGS, OF MILFORD, NEW YORK, ASSIGNOR TO DAVID WILBUR AND MOSES R. CUMMINGS, OF SAME PLACE.

IMPROVEMENT IN HOP-CULTURE.

Specification forming part of Letters Patent No. 211,295, dated January 14, 1879; application filed November 25, 1878.

*To all whom it may concern:*

Be it known that I, SCHUYLER CUMMINGS, of Milford, Otsego county, New York, have invented an Improvement in Apparatus for Growing Hops, of which the following is a specification:

My invention relates to an improvement in apparatus for supporting growing hops, by which the quantity of hops produced will be increased and their quality improved, the object of my invention being to provide an improved trellis or arrangement of strings or wire upon poles, by which the growing hops are kept separate and more exposed to the beneficial action of the sun and air, as well as to provide a stronger trellis, which will not be so liable to be blown down by heavy winds when loaded with hops; and the invention consists in the manner of constructing and arranging the poles and strings, as fully hereinafter described and claimed.

In the drawing is shown, in Figure 1, a general view of my improved trellis, and in Fig. 2 a view of an instrument for connecting the wires or cords together.

A represents the poles, to which the strings or wires are secured. They are made of the usual material, size, and form, and are arranged in the ordinary regular rows. The poles should, however, be of about the same size, and should be placed at equal distances from one another, so that the arrangement of the string or wire may be regular and uniform. The poles are provided with pins $a$ on opposite sides, a little below the middle of each pole. In the drawing are shown nine of these poles, forming a square, with one pole in the center, representing a section of a field.

B represents cords or wires, which pass horizontally from the top of one pole to another throughout the field. The poles are thus braced together and to one another, and afford each other support against the action of the wind, so that it is hardly possible for them to be blown down.

C represents cords or wires connecting the poles and the cords B. One end is fastened to each of the poles just below the pins $a$, by which it is held in place. The other end of these cords is fastened to the cords B a sufficient distance both from the poles and from the other cord, C, connecting the same cord B to another pole. Each cord or twine B between two poles would have two cords, C, secured to it a little distance apart. Each of the interior poles would have four twines or wires, C, attached to it, while those on the edge would have three and those on the corner two. This will permit, ordinarily, six vines to grow freely at each pole, two running up the pole itself and one up each twine.

To connect the diagonal to the horizontal wires when the poles are so high as to put them out of reach, I use the instrument D. (Shown in Fig. 2.) This consists of a handle of wood, having eyes or staples on one side, in which a metal rod, $b$, slides. The rod has a hook at its upper end, over which the diagonal cord C is placed, and it is raised to position by pushing up the rod to a sufficient height, and then connecting the two cords.

The advantages of my arrangement of the twine lie principally in the fact that the growing hops are by its use kept separate and prevented from clustering, and that each wire or cord is exposed to the sunlight and rain, causing the growth to be of equal quality throughout the vines.

There are various other advantages incidental to my construction, such as strength, cheapness, and general utility for the purpose for which it is intended, which will be evident upon inspection.

Having thus described my invention, what I claim as new, and desire to secure by Letters Patent, is—

1. The combination of the poles, the cords B, and the cords C, arranged in the manner and for the purpose set forth.

2. The improved trellis for growing hops, consisting of poles connected at their tops to one another by horizontal cords or wires B, and the cords C, attached to said poles and to said horizontal cords B, in the manner described.

3. In connection with the described trellis for hop-culture, the device D, having the sliding hook-rod $b$, substantially as and for the purpose set forth.

In testimony whereof I have signed my name to this specification in the presence of two subscribing witnesses.

SCHUYLER CUMMINGS.

Witnesses:
 I. DIEFENDORF,
 E. C. MANZER.